United States Patent [19]
Schuerg et al.
[11] Patent Number: 4,934,037
[45] Date of Patent: Jun. 19, 1990

[54] IMPELLER HOLDING APPARATUS

[76] Inventors: Carl D. Schuerg, 5 Whitetale La., Sweeney, Tex. 77480; Wendell O. Puderbaugh, Rte. 2 Box 2724, Brazoria, Tex. 77422

[21] Appl. No.: 423,216
[22] Filed: Oct. 18, 1989
[51] Int. Cl.[5] ........ B23Q 3/00
[52] U.S. Cl. ........ 29/283; 29/426.5; 29/281.1; 81/488; 269/287
[58] Field of Search ........ 81/488, 487, 13, 55; 29/283, 426.5, 240, 281.1, 281.4, 281.6; 269/287

[56] References Cited

U.S. PATENT DOCUMENTS 2,305,274 12/1942 Power ........ 81/13
2,468,983 5/1949 Johnson ........ 81/488
4,364,288 12/1982 Castoe ........ 81/55
4,564,991 1/1986 Taylor ........ 29/283

FOREIGN PATENT DOCUMENTS 281870 12/1927 United Kingdom ........ 81/13

*Primary Examiner*—Roscoe V. Parker
*Attorney, Agent, or Firm*—Richard C. Litman

[57] ABSTRACT

A tool to aid in the removal of an impeller from its respective shaft. The tool has two arms. One of the arms has gripping means in which the impeller vane is placed. The other arm has a hole through it so that the tool may be affixed to a rigid structure such as the pump impeller housing. The attachment of the tool of the present invention to a rigid structure allows the impeller to be fixed in position so that any rotary motion of the shaft does not cause the impeller to move.

7 Claims, 2 Drawing Sheets

IMPELLER HOLDING APPARATUS

BACKGROUND OF THE INVENTION

1. Field of the Invention

The present invention relates to the development of tools for specific purposes. More specifically, the present invention relates to tools which aid in the removal of impellers from their respective shafts. The present invention is a device that holds the impeller in a fixed position relative to a substantially immovable structure, such as the impeller housing, while the shaft is threadedly disengaged from the impeller.

2. Description of the Prior Art

Methods for removing impellers from their respective shafts have been developed over the years. The most common method is to hold the shaft steady and strike the vanes or blades of the impeller, thereby causing the impeller to threadibly disengage the shaft. Though this method is effective, there are a number of problems that arise.

First, by striking the impeller vane with a hammer, there is a great likelihood that the vane may bend, break or fracture. A small fracture of an impeller vane can be magnified many times by the extreme forces it will encounter during operation. As a result, a fracture or a break of the impeller vane renders the vane and pump inoperable due to balance problems while rendering the mechanical seal inoperable due to alignment. This usually results in the ruining of the mechanical seal. Repairs associated with mechanical seals are very expensive. These occurrences are more likely to occur in pumps which operate at high flow rates and high pressures. Inoperable pumps prolong the down-time of any process and can add considerably to the operating cost of a fluid system.

Not only can the impeller be fractured by such rough handling, but flying fragments from striking the vane can injure a person nearby. Striking the impeller vane is potentially harmful to both the individual and to the equipment. Thus, there is a hazard associated with the removal of an impeller vane should one follow this practice.

Removing an impeller from its shaft can also take a considerable amount of time in that an individual can not obtain the leverage necessary to remove the impeller simply by striking it with a hammer or other heavy object. Even when the impeller is struck by a large hammer, the force is often insufficient to loosen the impeller from the shaft in any rapid fashion.

The reason that the impeller may be difficult to remove can be attributed to a number of reasons. The impeller and shaft may have corroded together due to their continual contact with fluids such as water and corrosive chemicals. As a result, the impeller may be very difficult to remove. The simple striking of the impeller vane is often insufficient to overcome the adhesive forces that result from corrosion deposits and fused threads.

In addition to any corrosive deposits that may have formed, one must overcome the initial torque applied to the impeller when it was installed on the impeller shaft. In order to avoid catastrophic failure of an pump during operation, the impeller needs to be strongly threaded to the impeller shaft. Moreoever, during operation, the impeller may be subject to large stresses. The stresses encountered during operation will force the impeller still further onto the impeller shaft. Both of these causes hinder removal of the impeller when necessary. Regardless of other causes, the sheer magnitude of these two forces render removal of the impeller from its shaft a difficult process.

The present invention is a device that can hold an impeller in a fixed position while the shaft is rotated. The individual need only apply leverage to the shaft via a gripping tool with a long handle. By rotating the shaft, the impeller is protected from fracture damage. Moreover, the impeller may be removed rapidly from the shaft, because an individual may apply a force directly thereto.

SUMMARY OF THE INVENTION

Accordingly, it is an object of the present invention to provide an apparatus that facilitates the removal of an impeller from its shaft.

It is another object of the present invention to provide a means to hold the impeller in place during the removal process.

It is still another object of the present invention to provide an apparatus that grips the impeller and prevents rotation, thereby preventing the impeller from becoming damaged.

It is another object of the present invention to provide a means to attach the tool to a rigid structure relative to the impeller to aid in removal of the impeller from its shaft.

With these and other objects in view which will more readily appear as the nature of the invention is better understood, the invention resides in the novel combination and arrangement of parts hereinafter more fully described and illustrated, with reference being made to the accompanying drawings.

BRIEF DESCRIPTION OF THE DRAWINGS

Similar reference characters designate corresponding parts throughout the various figures of the drawings.

DESCRIPTION OF THE PREFERRED EMBODIMENT

Figure 1:
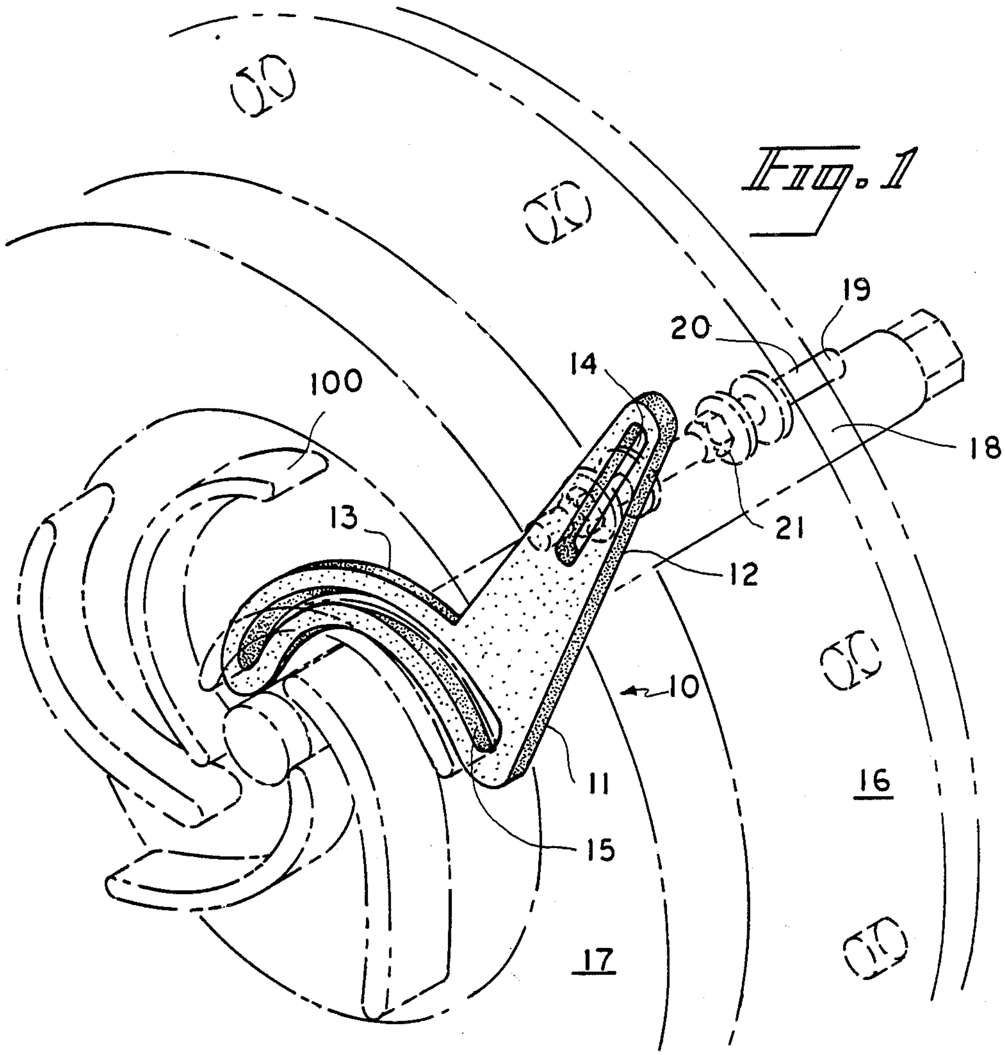
FIG. 1 is a perspective illustration of the present invention in use.
Figure 2:
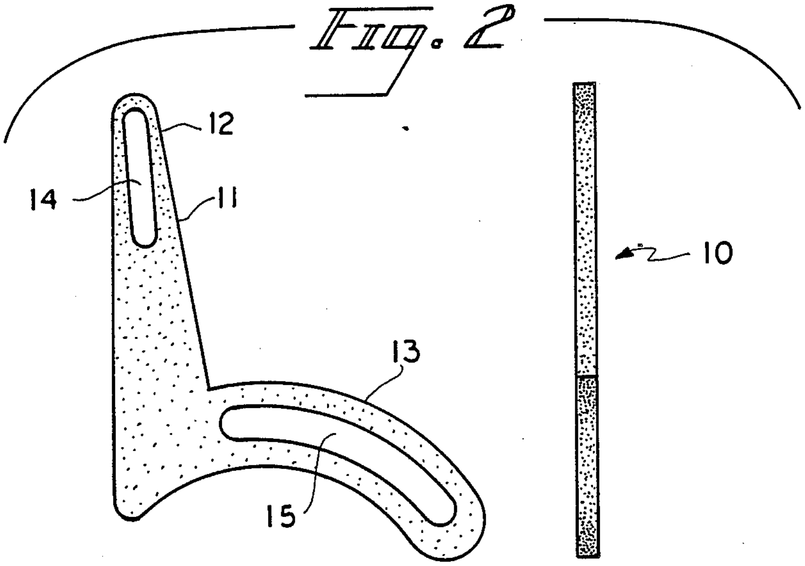
FIG. 2 front and a side elevation of the present invention.

The present invention is generally designated 10 in FIG. 1. The tool 10 is substantially comprised of an L-shaped rigid body 11 which has two arms, an attachment arm 12 and an impeller guide arm 13. As shown through the embodiment of FIG. 1, the attachment arm 12 has an elongated attachment hole 14 displaced through its center. The impeller guide arm 13 has an elongated guide hole 15 also displaced through its center portion. The combination of these components forms the structure of the tool 10.

The impeller guide arm 13 is arcuately shaped so that an impeller vane 100 may fit through the elongated guide hole 15. Essentially, the impeller guide arm 13 wraps around one of the impeller vanes 100 as shown in FIG. 1. As a result, when the tool 10 is affixed to an immovable structure such as the impeller housing 16, the impeller 17 is unable to move from its rigid position.

The attachment arm 12 is the segment of the tool 10 that affixes to the rigid structure 18. The elongated attachment hole 14 has an attachment means 19 threaded therethrough. The attachment means 19 connects to the rigid structure 18. Thus, the attachment means 19 holds the impeller 17 fixed relative to the rigid structure 18.

The attachment means 19 can be divided into several subparts. There is a threaded shaft 20 whereon are placed a number of locking bolts 21. The threaded shaft 20 fits through a hole on the rigid structure 18 and also through the elongated attachment hole 14. The bolts 21 screw onto either side of the attachment arm 12 and the rigid structure 18 to keep the impeller 17 and the tool 10 from moving.

The rigid structure 17 may be the impeller housing 16 as shown in FIG. 1. However, any suitable fixed structure will suffice The only requirement of the rigid structure 18 is that it be fixed relative to the impeller 17. This assures that the impeller 17 will not move when the shaft is turned by an individual.

Figure 3:
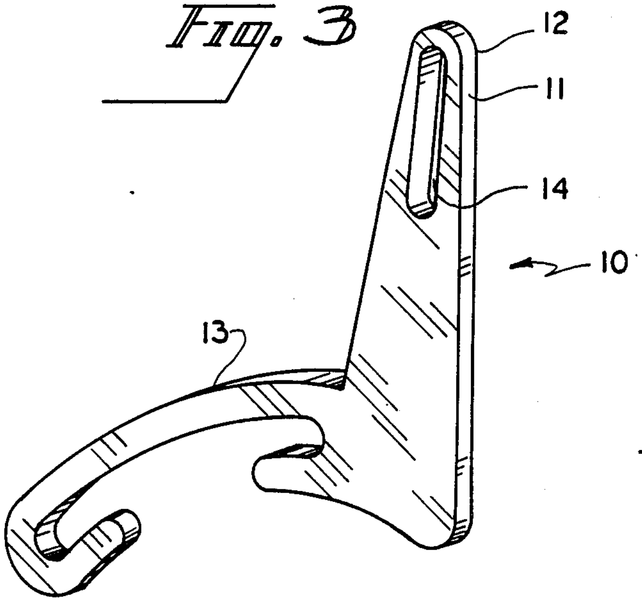
FIG. 3 is a perspective view of the present invention showing a slightly different embodiment than FIG. 1. A segment of the impeller gripping means has been deleted without substantially effecting the operability of the present invention.
Figure 4:
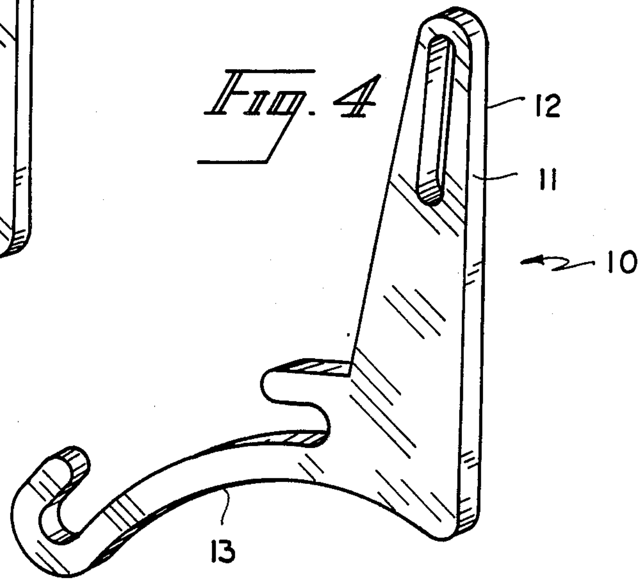
FIG. 4 is a perspective view of the present invention showing an alternate embodiment of that described pictorially in FIG. 3.

FIG. 3 and FIG. 4 show two alternate embodiments of the present invention, each of which are slight variations of one another. In FIG. 3, the impeller holding apparatus 10 has an impeller guide arm 13 with a segment of its upper arm portion removed. FIG. 4 describes the impeller holder 10 with a segment of its impeller guide arm lower section 13 removed. Both embodiments describe alternate embodiments of the present invention without deviating from the functionality of the present invention. However, the preferred embodiment is that of FIG. 1 as the inclusion of two separate members forming the impeller guide arm 13 adds additional strength to the present invention 10.

The elongated attachment hole 14 may be replaced by a singular, circular hole through the attachment arm 12. The circular hole is functionally equivalent to the elongated attachment hole 14. However, a circular hole would need be placed in a particular location. This location would be dependent upon the size of the impeller and the model of the impeller housing. As a result, it is not functionally equivalent to the preferred embodiment, because the singular, circular hole may not provide the adaptability that the preferred embodiment does.

It is to be understood that the present invention is not limited to the sole embodiment described above, but encompasses any and all embodiments within the scope of the following claims.

I claim:

1. An apparatus to hold an impeller fixed in position relative to a substantially immovable structure during removal from an impeller shaft comprising:

a rigid body, said rigid body including an impeller guide arm means and a attachment arm means, said impeller guide arm means being arcuately shaped to substantially match the curvature of a vane from an impeller thereby allowing for a rigid, non-injurious engagement of said vane from said impeller, said impeller guide arm means having gripping means disposed thereon for rigid engagement with said vane from said impeller, said attachment arm means being substantially straight and extends from said impeller guide arm means, said attachment arm means having an attachment hole means disposed therethrough, and said attachment hole means allowing for the placement therethrough of a rigid body attachment means allowing for the attachment of said rigid body to said substantially immovable structure.

2. An apparatus to hold an impeller fixed in position relative to a substantially immovable structure during removal from an impeller shaft according to claim 1, wherein:

said gripping means of said impeller guide arm means being an elongated hole disposed therethrough allowing for acceptance of said blade from said impeller therein.

3. An apparatus to hold an impeller in position relative to a substantially immovable structure during removal from an impeller shaft according to claim 1, wherein:

said attachment arm means having a top most portion and a bottom most portion, said impeller guide arm means having two ends, said impeller guide arm means being a single rod extending from the bottom most portion of said attachment arm means, and said gripping means of said impeller guide arm means being hook means disposed at both of said ends allowing for engagement of said vane from said impeller.

4. An apparatus to hold an impeller fixed in position relative to a substantially immovable structure during removal from an impeller shaft according to claim 1, wherein:

said attachment hole means being an elongated hole disposed through said attachment arm means allowing for placement of said attachment means at any position along the length of said attachment arm means.

5. An apparatus to hold an impeller fixed in position relative to a substantially immovable structure during removal from an impeller shaft according to claim 1, wherein:

said attachment hole means being a circular hole through said attachment arm means allowing for placement of said attachment means therethrough.

6. An apparatus to hold an impeller fixed in position relative to a substantially immovable structure during removal from an impeller shaft according to claim 1, wherein:

said rigid attachment means being a threaded shaft having a plurality of bolts threaded thereon, said bolts disposed on either side of said rigid body and either side of said substantially immovable structure, wherein said bolts holding said attachment means to said rigid body and said substantially immovable structure, and wherein said attachment means holding said impeller and said substantially immovable structure fixed in position relative to one another.

7. A method of use of an apparatus to hold an impeller fixed in position relative to a substantially immovable structure during removal from an impeller shaft comprising a rigid body, said rigid body including an impeller guide arm means and a attachment arm means, said impeller guide arm means being arcuately shaped to substantially match the curvature of a vane from an impeller thereby allowing for a rigid, non-injurious engagement of said vane from said impeller, said impeller guide means having gripping means disposed thereon for rigid engagement with said vane from said impeller, said attachment arm means being substantially straight and extending from said impeller guide arm means, said attachment arm means having an attachment hole means disposed therethrough, and said attachment hole means allowing for the placement therethrough of an attachment means allowing for the rigid attachment of said rigid body to a substantially immovable structure comprising the following steps:

placing said rigid impeller guide arm over the impeller vane wherein the impeller vane is gripped by said gripping means, attaching said attachment means to said rigid attachment arm and said substantially immovable structure, and threadibly disengaging the impeller from the impeller shaft by rotating said shaft.

* * * * *